July 17, 1962   P. A. LEPELLETIER   3,044,581
VEHICLE BRAKE-CONTROL SYSTEM
Filed Oct. 7, 1958   7 Sheets-Sheet 7

United States Patent Office 3,044,581
Patented July 17, 1962

3,044,581
VEHICLE BRAKE-CONTROL SYSTEM
Pierre André Lepelletier, Chatou, France, assignor to Societe Anonyme Francaise du Ferodo, Paris, France, a corporation of France
Filed Oct. 7, 1958, Ser. No. 765,808
Claims priority, application France Oct. 8, 1957
7 Claims. (Cl. 188—152)

An object of the present invention is a brake control hydraulic system for automotive vehicles and like applications of the type comprising two or more actuating primary circuits and one balancing secondary circuit, wherein during forward rotation of the wheels a larger pressure due to the brake shoe reaction than that in each primary circuit is developed in the secondary circuit at the moment at which the frictional surfaces of the brakes are urged into their contracting position by the pressures of the primary circuits, this system being constructed and arranged in accordance with the invention for ensuring an excellent balancing between the actual braking torques of the brakes and also a great safety if accidental breaking of any one of the circuits occurs, the said system comprising more particularly a pressure comparing device cooperating with the circuits for establishing equality or independence between the pressures of the primary circuits according as the pressure of the secondary circuit is low or high, while all said primary and secondary circuits are permanently separated from each other.

A further object of the present invention is a master-cylinder of simple and efficient construction with reduced dimensions, said master-cylinder incorporating the pressure comparing device.

A still further object of the present invention is a drum brake having a single or a double fluid feed and comprising a fixed backing plate, two coaxial piston devices slidably engaging in a cylinder member supported by the backing plate and to which the hydraulic fluid is supplied, a rotary brake drum, two brake shoes mounted freely with respect to the backing plate and operable to bear frictionally against the brake drum and the movement of each being controlled by one of the piston devices, a connecting device interconnecting the shoes independently of the backing plate at a position opposite to the cylinder member, a resilient restoring device applied between the shoes and urging the piston devices into abutting relationship, and resiliently loaded abutment means associated with the piston devices to locate the piston devices with respect to the cylinder member and to overcome a predetermined braking effort, such that in the released position a reserve of hydraulic fluid is provided within the cylinder member.

Further objects, features and advantages of the invention will appear in the reading of the following description of various embodiments thereof, selected by way of examples, reference being made to the accompanying drawings, wherein.

Figure 1:
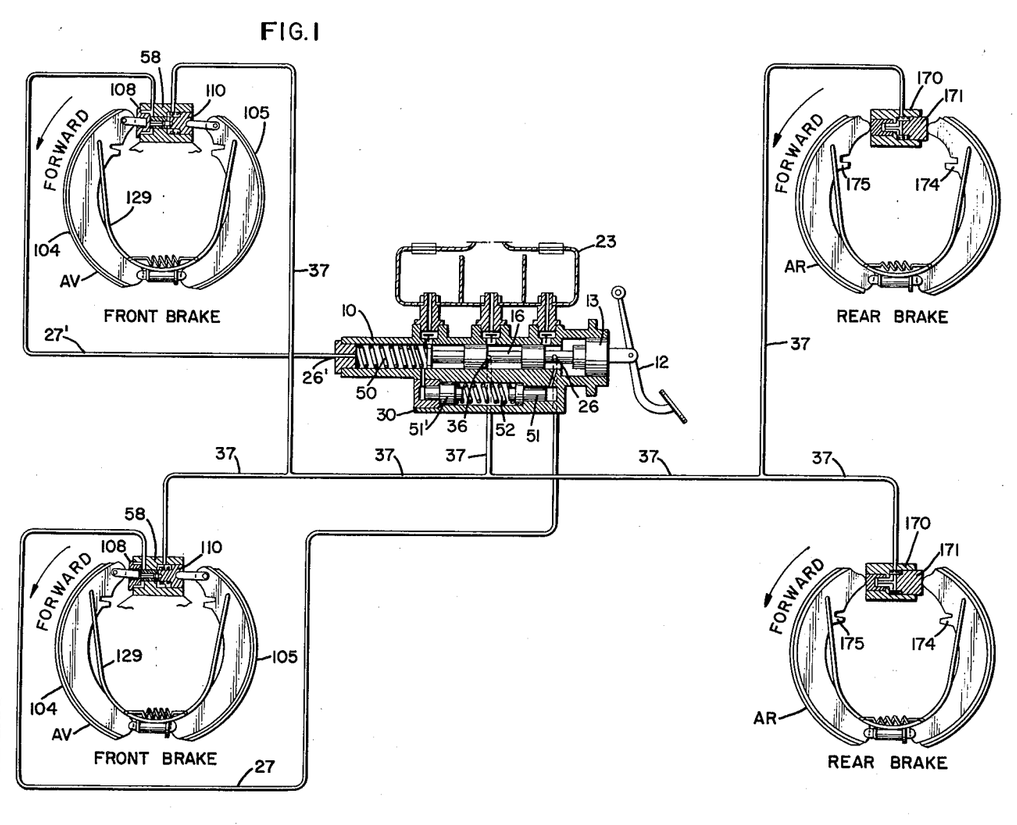
FIG. 1 is a schematic of a hydraulic braking system according to the invention.

Turning first to FIG. 1 illustrating an arrangement for braking an automobile, said arrangement includes a control pump or master-cylinder 10 actuated by the operator through the brake pedal 12, front brakes AV and rear brakes AR, together with pipes 27, 27′ and 37 transmitting to these different brakes the pressure developed by the pump 10, the brakes AV being fed by the primary and the secondary and the brakes AR being fed only by the secondary.

Figure 2:
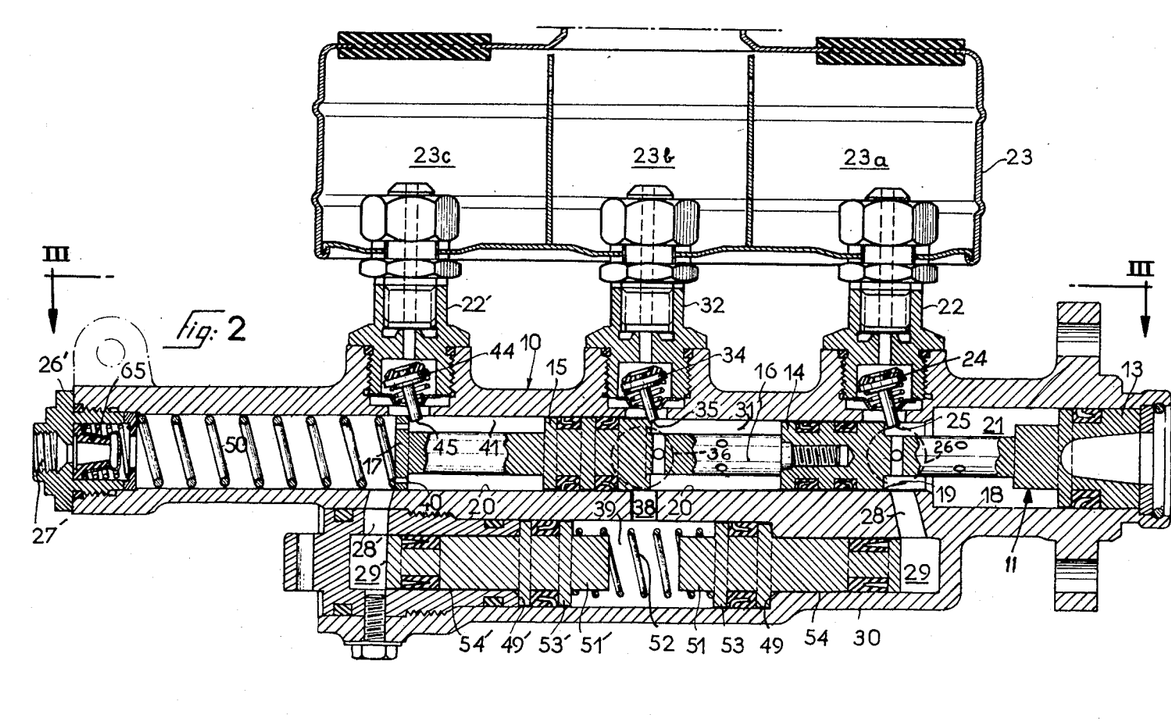
FIG. 2 is a longitudinal sectional view of a controlling pump according to the invention, through line II—II of Fig. 3.
Figure 3:
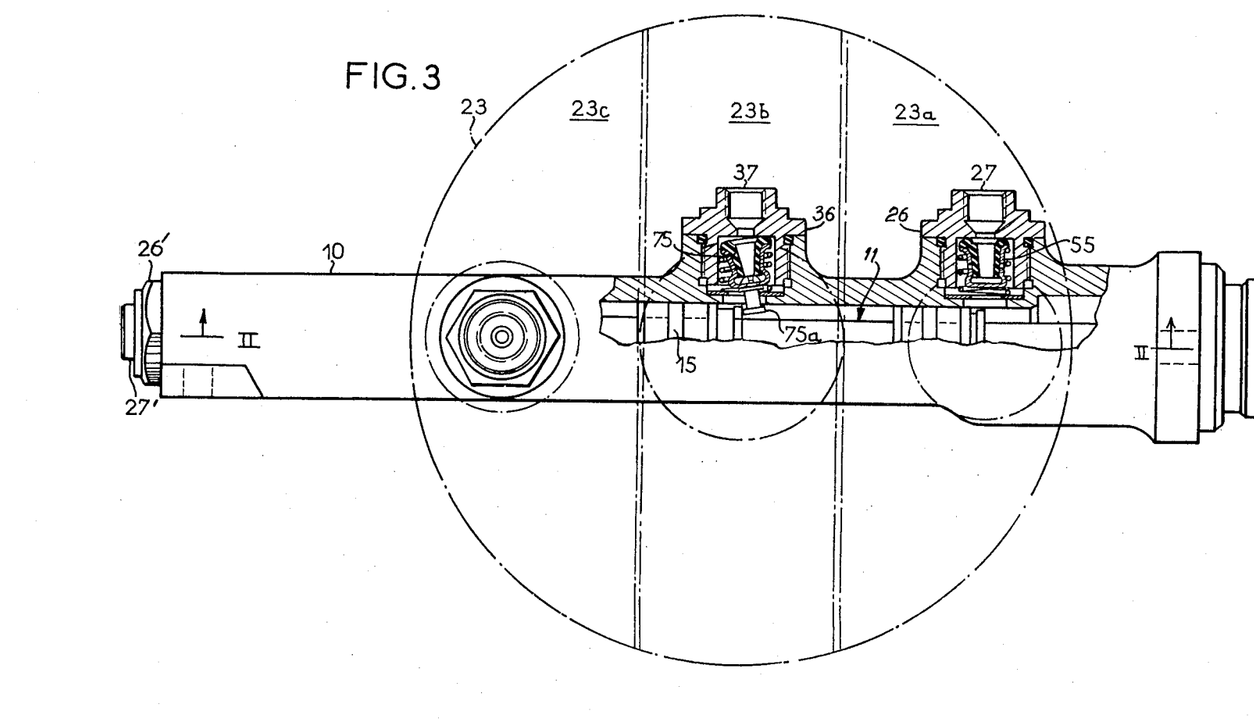
FIG. 3 is a plan view of said pump, with parts shown in section, according to arrows III—III of FIG. 2.

The pump illustrated in FIGS. 2 and 3 includes a movable block 11, the movements of which are controlled by the brake pedal 12 and which has a tendency to be urged into its released position by a spring 50. The block 11 includes a succession of three aligned spaced pistons 13, 14, 15 coupled by a rod 16 carrying furthermore a terminal collar 17. The piston 13 slides inside the bore 18, while the piston 14, the piston 15 and the collar 17 slide inside another bore 19—20 coaxial with the bore 18 and of a smaller diameter.

Between the pistons 13 and 14, there is formed inside the bores 18 and 19 an oil-filled space 21 which is connected at 22 with the compartment 23a of a common container 23 through the agency of a non-return flap valve 24.

The non-return valve 24 which is of a known type includes a tail-piece 25 cooperating with the piston 14. When the block 11 is released, the piston 14 holds the tail-piece 25 in its rocked position and the liquid may flow freely in both directions through the valve 24. As soon as the block 11 is shifted inwardly, the piston 14 releases the tail-piece 25 and the valve 24 allows the oil to flow in the direction leading from the container 23 towards the space 21 and prevents the flow in opposite direction. The space 21 is furthermore connected at 26 with the pipe 27 and it communicates at 28 with the outer chamber 29 of a pressure comparing device 30 associated with the pump 10.

Between the pistons 14 and 15 and inside the bores 19 and 20 is formed an oil space 31. Said space 31 is connected at 32 with a further compartment 23b of the common container 23 through the agency of a non-return flap valve 34. The tail-piece 35 cooperates with the piston 15 in a manner similar to that disclosed for the cooperation between the tail-piece 25 of the flap valve 24 and the piston 14. The space 31 is furthermore connected at 36 with pipe 37 and it communicates at 38 with a central chamber 39 of the comparing device 30.

Between the piston 15 and the end of the pump, there is formed inside the bore a further oil space 41; the collar 17 extends across said space 41 without partitioning the latter as allowed by the presence of the ports 40 passing through said collar. The volume of the space 41 decreases when the block 11 is urged into the pump body. The cross-sections of the block 11 are selected in a manner such that for a same inward movement of the block 11, the volumes of the spaces 21 and 41 may be reduced by equal amounts. The space 41 is connected at 22′ with a further compartment 23c of the common container 23 through the agency of a non-return flap valve 44 including a tail-piece 45 similar to the flap valves 24 and 34. The tail-piece 45 cooperates with the collar 17 in the manner described with reference to the tail-pieces 25 and 35 associated with the cooperating pistons 14 and 15. The space 41 is furthermore connected at 26′ with a pipe 27′ and it communicates at 28′ with the second outer chamber 29′ of the comparing device 30. The two outer chambers 29 and 29' have equal diameters, smaller than that of the central chamber 39. 49 and 49' designate the annular shoulders connecting the chamber 39 with the chambers 29 and 29' respectively.

The comparing device 30 includes two symmetrically arranged plunger pistons 51 and 51'. Each plunger includes a head 53, 53' slidingly and fluidtightly engaging the larger central chamber 39 and a tail-piece 54 or 54' slidingly and fluidtightly engaging the smaller corresponding outer chamber 29 or 29'. The plunger pistons 51 and 51' are mounted shiftably between a predetermined position of maximum spacing for which they are urged respectively against the shoulders 49 and 49' and a position of interengagement for which their heads 53 and 53' engage each other. In this latter position, the assembly of the two plungers may move freely between the two shoulders 49 and 49', their length of possible travel being equal to the distance separating the two heads for the first position thereof.

The plunger pistons 51 and 51' are subjected to the action of the pressure evolved in the chamber 39 and to the action of the pressures evolved in the chambers 29 and 29'. Furthermore, a spring 52 is fitted between said plunger pistons 51 and 51' and urges them into their position of maximum spacing chiefly with a view to ensuring in their released condition such a well-defined position.

Valves 55, 65, 75 of a well known type operating under residual pressure are provided in the connections 26, 26,' 36 opening into the pipes 27, 27', 37, so as to allow the passage of oil in both directions; but this passage is not free and is obtained against the action of a small diaphragm in a direction leading towards the pipes and against the action of a weak spring in the opposite direction.

The valve 75 inserted in the connection 36 includes a rod 75a cooperating with the piston 15 (FIG. 3), in a manner such that its action is cut out when in its released position for which it establishes a free bilateral connection between the container 23 and the pipe 37 through the valves 34 and 75. A similar arrangement may be used for the valve 55 associated with the pipe 27 and in the case where the connection 26' is arranged laterally, as in the case of the connection 26 for the valve 65 associated with the pipe 27'.

The free bilateral connections thus obtained for the release position of the pump between one or more circuits and the corresponding container compartments have for their result to subject said circuits to a predetermined inner pressure which is exactly equal to the static pressure produced by the head of the container in the case where the latter is connected directly with the atmosphere. In a modification, the container may be protected against the atmosphere and its upper portion may serve as a collector of compressed air so as to define an inner pressure which is higher than the precedingly described static pressure.

The pipes 27 and 27' (FIG. 1) form elements of the primary braking circuit and are connected with the primary chambers 56 (FIG. 4) of the brake cylinders 58. The pipe 37 forms part of the secondary braking circuit and is connected with the secondary chambers 57 of the cylinders 58. The arrangement of brakes and wheel cylinders is such that the main stresses involved in forward rotation of the wheels are equalized through the intermediary of the secondary circuit between front and rear brakes whereby an improved balancing between the actual braking torques of the four brakes is provided. In the example illustrated in FIG. 1, the front brakes AV are fed both by the primaries 27 and 27' and by the secondary 37, while the rear brakes AR are fed by the secondary 37.

When it is desired to proceed with a braking (FIGS. 1, 2, 3), the pedal 12 is depressed so that the block 11 releases the tail-pieces 25, 35, 45 and closes the flap valves 24, 34, 44. The volumes of the primary spaces 21 and 41 are reduced by equal amounts. The oil is urged into the primary pipes 27 and 27' and at the same time it acts inside the chambers 29 and 29' on the plunger pistons 51 and 51' against the action of the spring 52, the strength of which is advantageously selected so as to be high enough for the plunger pistons 51 and 51' to remain in contact with the shoulders 49 and 49'.

During forward rotation of the wheels a larger pressure due to the brake shoe reaction than that in the primary circuit is developed on the secondary side at the moment at which the frictional surfaces of the brakes AV are urged into their contacting position by the pressure in pipes 27 and 27'. The oil is urged under high pressure through the circuit 37 towards the rear brakes and towards the pump 10. The high pressure is established inside the chamber 39 and holds the plunger pistons 51 and 51' in their extreme spaced position, which ensures pressure independence for the primary pipes 27 and 27' and allows the equalizing effect of the reaction ensured by the secondary circuit. During the continuation of the depression of the pedal 12 the braking is increased, while said balance is retained.

In contradistinction, during rearward movement and at the moment at which the frictional surfaces of the front brakes subjected to the pressure of oil driven into the primaries 27 and 27' enter their contacting position, no substantial reaction is produced on the secondary side. The pressure has then a tendency to rise much more speedily in the chambers 29 and 29' than in the chamber 39 and the plunger pistons 51 and 51' move away from their shoulders 49 and 49'. A pressure connection is established in the three circuits 27, 27' and 37 and ensures oil flow into the secondary circuit 37 through the operation of the plunger pistons 51 and 51' moving towards each other inside the chamber 39. The travel of the plunger pistons 51 and 51' is selected so as to be sufficiently high for the volume of oil driven out of the chamber 39 to ensure a maximum expansion of the secondary circuit. This pressure connection being established, the four brakes are immediately set in their expanded condition according to conventional practice, while the primary pistons of the front brakes are returned energetically into their starting position under the influence of the braking reaction.

If, for any reason whatever, the spring 52 is compressed more or less by the primary pressure in the chambers 29 and 29' at the beginning of the actuation of the brake pedal 12 during forward progression, i.e. before the high secondary pressure is established inside the chamber 39, this beginning operation will be produced partly in accordance with the procedure corresponding to forward progression, and partly in accordance with the procedure corresponding to rearward progression. However, this compound procedure is transient and will not be noticed, since the first contact provided by the frictional surfaces of the brakes has for its result an immediate return of the plunger pistons 51 and 51' against their stops 49 and 49' as a consequence of the high secondary pressure established in the chamber 39.

If, fortuitously, one of the primary circuits 27 or 27' were to break, the operation would remain the same as that described for forward and rearward progression, except that the block 11 and pedal 12 would merely travel further. It should be remarked that the plunger corresponding to the broken primary, for instance the plunger 51' in the case of the primary 27' being broken, remains permanently in contact with the shoulder 49'. The operation would be the same as that of a pump provided with a single primary chamber instead of two or more. On the other hand, the movable member of the front brake in which is sensitive to the primary 27' would remain in contacting relationship in its starting position.

If, in a similar fortuitous manner, the secondary circuit 37 breaks, the rear brakes AR would be inoperative both for forward and for rearward movement. After an idle travel of the pedal 12 and of the block 11, the oil driven into the chambers 29 and 29' brings the plunger pistons 51 and 51' into contact with each other and said plunger pistons form a sliding unit establishing a pressure connection under equal pressure conditions between the primaries 27 and 27'. A conventional equilibrium is thus provided for the front brakes AV.

Figure 4:
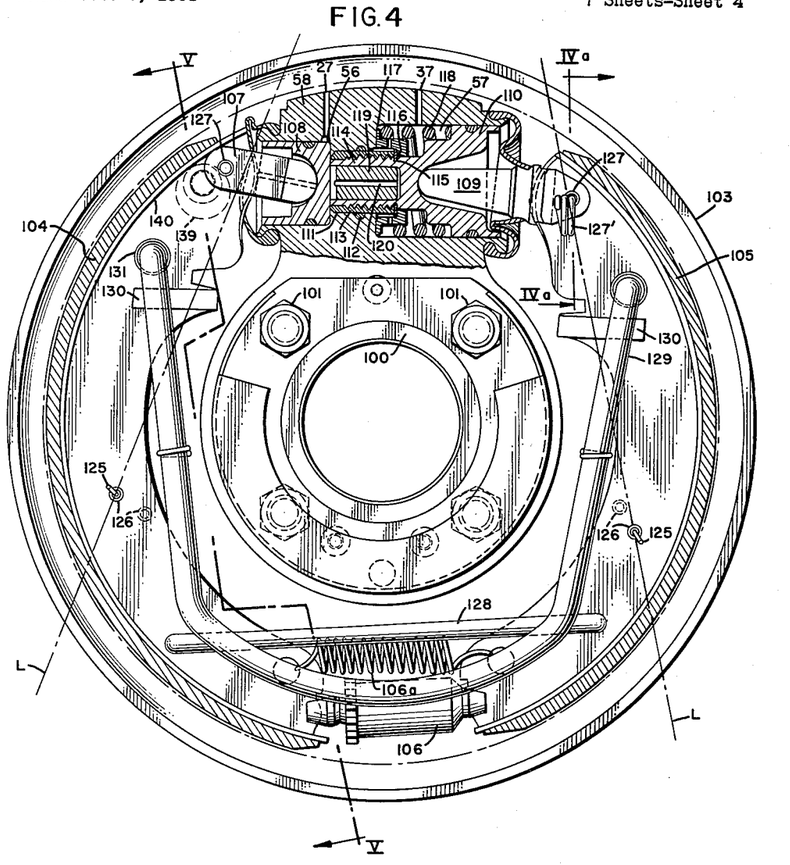
FIG. 4 is a general view of a brake provided with double feeding means.
Figure 4A:
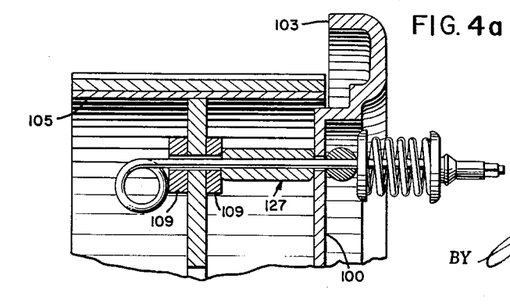
FIG. 4a is a fragmentary sectional view taken on line IVa—IVa of FIG. 4.
Figures 5, 6:
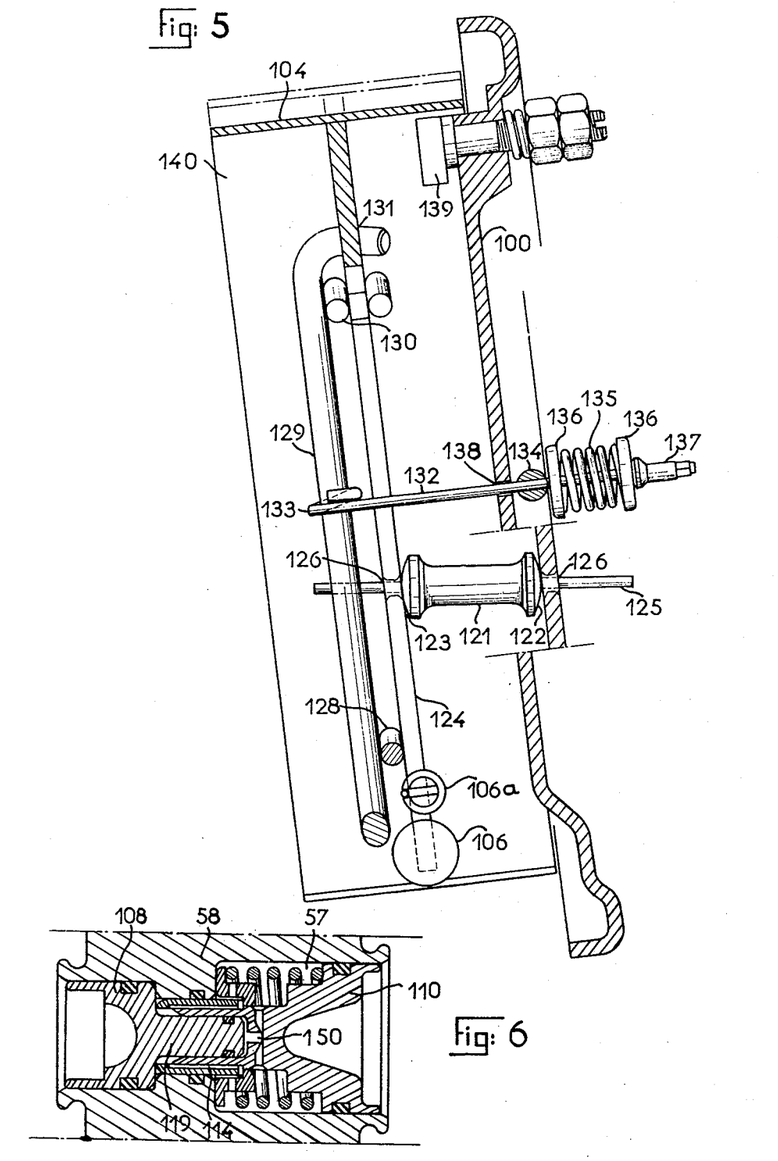
FIG. 5 is a cross-sectional view on a larger scale of the brake illustrated in FIG. 4, through the broken line V—V of said figure.
FIG. 6 is a view of a modification of the brake cylinder shown in Fig. 4.

Referring now to FIGS. 4, 4a and 5 illustrating a front brake having a primary chamber 56 and a secondary chamber 57, 100 designates the stationary backing plate of the brake with its securing means 101 and the cylinder 58 provided with the chambers 56 and 57, while 103 designates the rotary drum. The shoes 104 and 105 which cooperate with the drum 103 are interconnected by a connecting rod 106 associated with a small positioning spring 106a. The shoe 104 is operatively connected through a lever 107 with the piston 108 fitted inside the primary chamber 56, while the shoe 105 is operatively connected through the lever 109 with the piston 110 fitted in the secondary chamber 57.

The secondary piston 110 is provided with a rod 111 ensuring the centering with reference to the cylinder and adapted to enter the primary chamber 56 by sliding with reference to a packing 112 which separates the chambers 56 and 57 from each other. The rod 111 is provided outwardly with a sleeve 113 sliding through the packing 112 and screwed over a threaded end-piece 114 of the piston 110. A static packing 115 is fitted and crushed between the sleeve 113 and a shoulder 116 on the end-piece 114, so as to perfect the fluid tightness between the chambers 56 and 57 in registry with the thread on the end-piece. A sliding member 117 fitted over the end-piece beyond the packing 115 which serves as a stop for it forms a shoulder engaging a helical spring 118 subjected to a preliminary stressing and the other end of which bears against the piston 110. Preferably, the primary piston 108 includes a tail-piece 119 fitted inside the end-piece 114, so as to provide for the accurate centering of the two pistons with reference to each other and with reference to the cylinder. The tail-piece 119 is provided with inner passageways 120 adapted to allow a free flow of oil inside the end-piece 114.

Such an arrangement of the pistons 108 and 110 has for its result a minimum predetermined spacing and a predetermined released position for them and it also ensures a predetermined substantial provision of oil inside the chamber 57 when no liquid pressure is applied to the chamber 56 or to the chamber 57, while the movements of liquid from the master-cylinder to the primary chamber 56 are reduced during the slight rotations of both primary and secondary shoes due to the compression of the oil in the secondary chambers. It is easy to understand that in such a movement the amount of oil to be supplied by the master cylinder through the primary pipes into the primary chambers is in relationship with the difference of the section of the primary chamber 56 and that of the rod 111, and not with the section of the primary chamber 56 only, which is greater. Thus the travel of the brake pedal during the rotations of the shoes is in dependence on the sections of both the primary chamber 56 and the rod 111 and is advantageously reduced by the latter.

In the same manner, the slight difference occurring between the braking torques of the two front brakes due to the difference of the coefficient of friction of the linings is only in dependence on the difference of the two primary pressures involved into the primary circuits 27 and 27' multiplied by said difference of the section of the primary chamber 56 and that of the rod 111, so that it is also advantageously reduced by the presence of the latter. Furthermore, there is obtained an increased braking during rearward movement and generally speaking an increase of the advantageous specific properties of the arrangement, by reason of a narrower cooperation of the brakes. The cross-section of the secondary piston rod 111 may be selected so as to be equal to about one half of the cross-section of the primary chamber 56.

The shoes 104 and 105 are held at a distance from the plate 100 and are separated therefrom by a substantial gap so as to never touch it and to avoid parasitic friction and wear such as would arise through such a contact. To this end, each shoe 104 or 105 is separated from the plate 100 by a stay 121 registering with an intermediate area of the shoe. The stay 121 is constituted by a sphere limited to its useful portion formed by the spherical caps 122 and 123 engaging respectively the plate 100 and the central rib 124 of the shoe. A rod 125 fitted axially on and rigidly with the stay 121 and extending beyond the caps 122 and 123 engages perforations 126 in the plate 100 and in the rib 124. In all its positions, said axial rod 125 forming an extension for the stay 121 slopes by an angle higher than a given minimum value with reference to a perpendicular to the plate 100, so as to ensure during operation a proper rolling of the caps 122 and 123 over the surfaces 100 and 124, the paths of said caps when running over said surfaces lying always outside the openings 126.

Further spacing means 127 are arranged in a manner similar to the stay 121 near the ends of the shoes 104 and 105 adjacent the cylinder 58. One means 127 connects the shoe 104 with the lever 107 and another means 127 connects the shoe 105 with the lever 109. Each means 127 comprises a tie having an end 127' shaped for preventing the tie from escaping, said end 127' being corkscrew-shaped in the example shown.

Each shoe 104 and 105 has thus a minimum spacing line L with reference to the plate 100, which line passes in parallelism with the plane of said plate 100 through the spacing means 121 and 127. Said line extends transversely of the axis of the cylinder 102 and forms a rocking axis for the shoe. Such an arrangement accommodates the shoes to fit exactly to the drum if drum distortion occurs, for instance under the influence of heavy braking power or of high temperatures or of both effects simultaneously, and it does not oppose other slight motions of the shoes.

The two shoes 104 and 105 are maintained in correct relationship with reference to each other, in parallelism with the plate 100 by a bar 128. The latter engages the webs 124 of the shoes 104 and 105 in the vicinity of the link- or connecting rod 106 through the agency of a bow-shaped member 129 bearing near its ends on the projections 130 of the webs 124 of the shoes 104 and 105, so as to carry entirely the system including the shoes, the bar 128 and the bow-shaped member 129.

The ends of said member 129 are bent so as to engage openings 131 in the ribs 124 and to play the part of a spring returning the shoes 104 and 105 towards a released position defined by the positive engagement between the two pistons 108 and 110 and the elastic engagement of the piston 110 with the bottom of the cylinder 58. The member 129 is urged elastically in a direction perpendicular to the plate 100 against the bar 128 and against the projections 130, as provided by lateral ties 132 attached at 133 to the intermediate section of the area of the member 129. Each lateral tie 132 passes through an opening 138 in the plate 100 so as to receive on the opposite side of the plate a ball 134 engaging a boss in the plate. A helical spring 135 is guided between two cups 136 fitted over the tie 132, one of said cups engaging the ball 134 and the other a stop 137 screwed over the end of said tie 132.

A guiding member 139 carried by the plate 100 cooperates with one of the shoes or of each shoe 104 and 105, for controlling return movement thereof and engages the inner cylindrical surface 140 of the shoe considered. The guide 139 is advantageously adjustable and is in the shape of an eccentric, as illustrated in FIG. 4. It is easy to understand that when the brakes are released the primary shoe 104, for instance, would not move back in a definite direction following the inward movement of the primary piston 108 if there were no guiding member 139.

In fact, it would move about in the same manner that the primary piston 108 i.e. horizontally in FIG. 4, instead of circumferentially and it would have a non proper released position thus risking of involving brake drag. So the guiding member 139 ensures proper released position of the shoe and avoids completely brake drag.

In the modification illustrated in FIG. 6, the arrangement of the cylinder is similar to that illustrated in FIG. 4 but the tail-piece 119 of the piston 108 is subjected to the pressure in the secondary chamber 57 instead of the pressure in the primary chamber 56, this being obtained by cutting out the passageways 120 in the tail-piece 119, which passageways are replaced by passageways 150 in the tail-piece 114, and by incorporating a packing 151. The operation is similar to that which has been precedingly described, except for the fact that the secondary pressure acts directly on both pistons 108 and 110.

Figure 7:
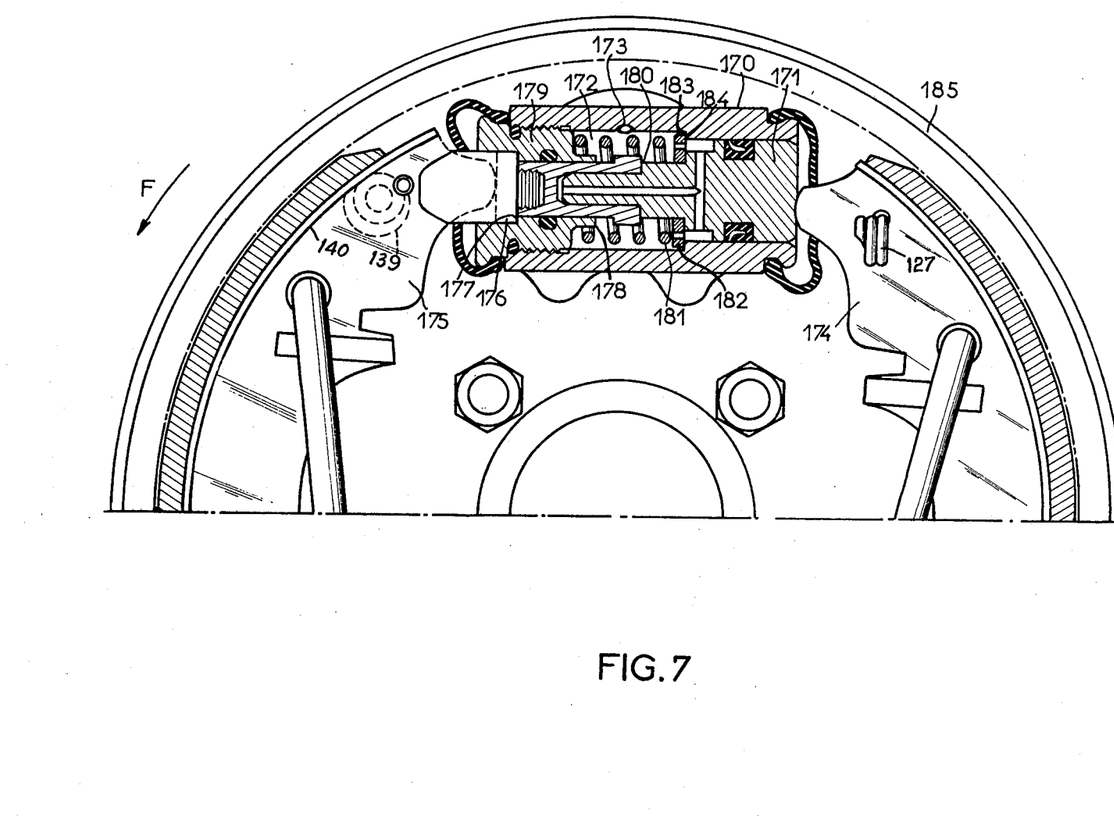
FIG. 7 is a partial view of a brake provided with single feeding means.
Figure 8:
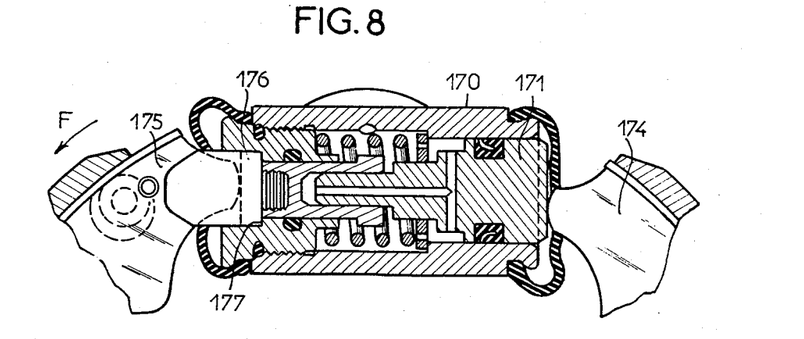
FIGS. 8 and 9 are views of the brake of FIG. 7 for other operative positions.
Figure 9:
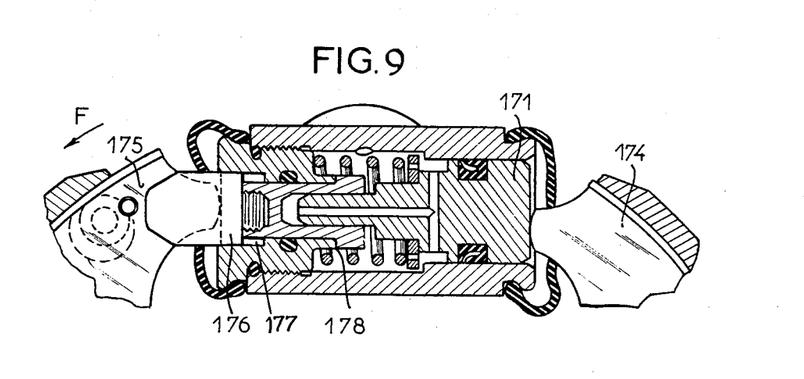

Turning now to FIGS. 7, 8 and 9, said figures relate to a brake cylinder 170 provided with a single chamber 172 fed by a single circuit under pressure. Such cylinders serve, for instance, for the rear brakes AR of FIG. 1 to be fed by the secondary circuit.

A piston 171 is fitted in the chamber 172, and its shifting upon expansion faces a direction opposed to the most frequent direction F of the movement of the drum. The piston 171 is subjected to the pressure of oil arising in the chamber 172 of the cylinder starting from the admission port 173, so that it urges the shoe 174 against the drum 185 revolving in the direction F. 175 designates the other shoe which is connected with the shoe 174 through any suitable elastic means, the general assembly being preferably similar to that illustrated in FIGS. 4 and 5.

According to the invention, the shoe 175 is urged no longer against a stationary bearing, but against a piston 176, the diameter of which is smaller than that of the piston 171. The piston 176 slides, with a shifting limited in either directions by an outer stop 177 and an inner stop 178 respectively, inside the bore formed in a plug 179 screwed into the end of the cylinder 170.

The two pistons 171 and 176 may engage each other at 180 as shown in FIG. 7 and they may move away from said interengaging position as shown in FIGS. 8 and 9. A spring 181 is fitted between the stationary plug 179 and a washer 182. The latter engages a shoulder 184 in the chamber 172 and may form a stop for the shoulder 183 of the piston 171. Such an arrangement of the pistons 171 and 176 has for its result a minimum predetermined spacing and a predetermined location in their inoperative position together with the existence of a substantial well defined provision of oil inside the chamber 172 when liquid pressure is not applied.

When released, the association of elastic means returning the two shoes 174 and 175 towards each other with the centering means 181 and 182 has for its result to return the whole system into the position illustrated in FIG. 7, for which on the one hand the washer 182 engages the shoulder 184, and, on the other hand, the pistons 171 and 176 engage respectively at 183 the washer 182 and at 177 the plug 179, said pistons engaging each other at 180.

For forward progression, when the braking pressure arises inside the chamber 172, said pressure acts on the pistons 171 and 176 and shifts only the piston 171 having a larger cross-section and this produces the engagement of the shoes 174 and 175 with the drum 185 (FIG. 8). The pressure rises then inside 172 and its value becomes sufficiently high so as to shift in its turn the small piston 176 into engagement with the inner stop 178 in spite of the reaction of the shoe 175, which drives simultaneously the shoes 175 and 174 and the piston 171 into a peripherical movement over a common path (FIG. 9).

During this peripheral movement of the two shoes, and during the associated travel of the two pistons and of the two shoes in the direction F, the volume of the chamber 172 decreases, which returns back a given amount of oil into the secondary circuit 37 and reduces in the same proportion the amount of oil to be supplied into said secondary circuit 37 by the secondary pistons 110 of the front brakes, with as a result a reduced rotation movement of the front shoes and a reduced travel of the brake pedal to get a given braking power.

If, for any reason whatever, at the beginning of the braking procedure, i.e. before the frictional surfaces engage each other, the piston 176 moves before the piston 171 and produces a contact between the shoes 174 and 175 and the drum 185 until the position illustrated in FIG. 9 is reached without passing however through the intermediate stage of FIG. 8. Similarly, if the two pistons 171 and 176 move simultaneously under the action of the pressure arising at 172, this would lead to the condition illustrated, whatever may be the intermediate stages of the expanding procedure.

In the case of rearward movement, the drum revolving in a direction opposed to that of the arrow F, while the braking pressure rises in the chamber 172, the conventional expansion is produced by the piston 171, the piston 176 being held in the position illustrated in FIG. 7 by the braking reaction.

What I claim is:

1. A master-cylinder for a brake-control hydraulic system having at least two primary circuits and one secondary circuit comprising a stationary body, a control unit slidingly engaged in said body and presenting piston means defining with said body two primary spaces and a secondary space, connecting means for connecting said primary spaces with said primary circuits respectively, connecting means for connecting said secondary space with said secondary circuit, said connecting means having residual pressure valves, container means for filling said spaces, feeding means for feeding said spaces from said container means having non-return valves, and a comparing pressure device having a cylinder means, two plungers slidingly engaged in said cylinder means and defining therein a front chamber, an intermediate chamber and a rear chamber, said front chamber being connected with one of said primary spaces, said intermediate chamber being connected with said secondary space, said rear chamber being connected with another of said primary spaces, opposite inwardly interengaging faces on said plungers, and stationary abutments for said plungers defining outward abutted positions of said plungers.

2. A hydraulic drum brake comprising a stationary backing plate, a cylinder member supported by the backing plate, means for supplying hydraulic fluid to said cylinder member, two coaxial piston means slidingly engaged reciprocable in said cylinder member and responsive to fluid pressure, a rotary brake drum, two brake shoes, connecting means for connecting the end of each brake shoe with one of said piston means respectively, interconnecting means for interconnecting the shoes independently of the backing plate and extending at a position opposite to the cylinder member, said brake shoes being operable to bear frictionally against the brake drum, a resilient restoring means applied between the shoes and urging the piston means into abutting relationship, and resiliently loaded abutment means associated with the piston means to locate the piston means with respect to the cylinder member and to overcome a predetermined braking effort, said resilient loaded abutment means having a sliding collar movable to abut against a part of the cylinder member and against one of the pistons and having a prestressed spring disposed to bear against the sliding collar and the other piston means.

3. A brake as claimed in claim 2, further comprising inclined distance pieces disposed for preventing direct contact between the shoes and the plate, lateral tie rods holding said pieces and engaging said resilient restoring means, and a small stabilizing bar engaging the shoes and bearing against said resilient restoring means.

4. A double feed brake as claimed in claim 2, wherein two chambers are provided in the cylinder member for the two piston means respectively, one piston having a hollow end portion, said portion penetrating in the chamber of the other piston means, said other piston means having a centering stem portion engaging in said hollow end portion, and a passageway provided in one of said portions for submitting the stem portion end to the pressure of one of said chambers.

5. A single feed brake as claimed in claim 2, wherein a single chamber is provided in the cylinder member for the two piston means, one piston means being of larger section than the other piston means, two abutment means limiting the movement of said other piston means in both directions.

6. A brake-control hydraulic system for at least two brakes each having a double wheel-cylinder, a primary piston defining a primary chamber and a secondary piston defining a secondary chamber in said cylinder, and a pair of interconnected brake shoes each also connected with one of said pistons respectively, the said system comprising two primary hydraulic circuits respectively connected with the primary chambers of said brakes, one secondary hydraulic circuit connected with the secondary chambers of said brakes, all said primary and secondary circuits being permanently separated from each other, control means for developing primary pressures in said primary circuits whereby said primary pistons urge said brake-shoes into contacting position and said secondary pistons receive brake shoe reactions and pressurize said secondary circuit under a secondary pressure and a fluid tight pressure comparing device cooperating with said circuits and making the primary pressures equal with each other when the secondary pressure is less than a predetermined value while making said primary pressure independent from each other when the secondary pressure is above said value, said comparing device comprising a cylinder means, two plungers reciprocable in said cylinder means and defining therein two end chambers and an intermediate chamber, said end chambers being connected with said primary circuits respectively, said intermediate chamber being connected with said secondary circuit, opposite inwardly interengaging faces on said plungers, stationary abutments in said cylinder means for said plungers defining outward abutted positions of said plungers whereby the said plungers are interengaged equalizing the primary pressures when the secondary pressure is underneath said predetermined value and are abutted against said abutments making independent the primary pressures when the secondary pressure is above said value.

7. A brake-control hydraulic system as claimed in claim 6, further comprising spring means resiliently biasing said plungers against said abutments.

References Cited in the file of this patent

UNITED STATES PATENTS

| | | |
|---|---|---|
| 2,147,082 | Beusch | Feb. 14, 1939 |
| 2,266,597 | Green | Dec. 16, 1941 |
| 2,285,310 | Strebinger | June 2, 1942 |

FOREIGN PATENTS

| | | |
|---|---|---|
| 1,146,888 | France | May 27, 1957 |